(12) United States Patent
MacInnis et al.

(10) Patent No.: US 9,774,875 B2
(45) Date of Patent: Sep. 26, 2017

(54) LOSSLESS AND NEAR-LOSSLESS IMAGE COMPRESSION

(75) Inventors: Alexander G. MacInnis, Los Altos Hills, CA (US); Lei Zhang, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 1736 days.

(21) Appl. No.: 12/720,273

(22) Filed: Mar. 9, 2010

(65) Prior Publication Data

US 2010/0232497 A1 Sep. 16, 2010

Related U.S. Application Data

(60) Provisional application No. 61/158,908, filed on Mar. 10, 2009.

(51) Int. Cl.
*H04N 7/12* (2006.01)
*H04N 11/02* (2006.01)
*H04N 11/04* (2006.01)
*H04N 19/426* (2014.01)
*H04N 19/61* (2014.01)
*H04N 19/124* (2014.01)
*H04N 19/423* (2014.01)

(52) U.S. Cl.
CPC ......... *H04N 19/426* (2014.11); *H04N 19/124* (2014.11); *H04N 19/423* (2014.11); *H04N 19/61* (2014.11)

(58) Field of Classification Search
CPC ............. H04N 7/26053; H04N 7/2609; H04N 7/26186; H04N 19/115; H04N 19/152; H04N 19/149; H04N 19/19
USPC ...................................... 375/240.03
See application file for complete search history.

(56) References Cited

U.S. PATENT DOCUMENTS

| 5,260,782 A * | 11/1993 | Hui ......................... 375/240.15 |
| 6,094,455 A * | 7/2000 | Katta .................. H04N 19/159 348/419.1 |
| 6,175,650 B1 * | 1/2001 | Sindhu et al. ................ 382/171 |
| 6,229,852 B1 * | 5/2001 | Hoang ..................... 375/240.25 |
| 6,381,274 B1 * | 4/2002 | Sugahara ................ 375/240.05 |
| 6,862,320 B1 * | 3/2005 | Isu et al. .................. 375/240.27 |
| 2005/0036551 A1 * | 2/2005 | Winger ................. H04N 19/52 375/240.16 |
| 2006/0072836 A1 * | 4/2006 | Chen et al. .................... 382/232 |
| 2007/0058713 A1 * | 3/2007 | Shen et al. ................. 375/240.2 |
| 2009/0135921 A1 * | 5/2009 | Lei et al. ....................... 375/245 |
| 2009/0254783 A1 * | 10/2009 | Hirschfeld et al. ........... 714/701 |

* cited by examiner

*Primary Examiner* — Jeremaiah C Hallenbeck-Huber
(74) *Attorney, Agent, or Firm* — Foley & Lardner LLP

(57) ABSTRACT

Presented herein is lossless and near-lossless image compression. In one embodiment, there is described a method for encoding data. The method comprises receiving said data; quantizing a predetermined amount of the data with a predetermined quantization step; determining how many bits represent the predetermined amount of the data quantized with the predetermined quantization step; and wherein if the amount of data exceeds a predetermined amount of bits, changing the quantization step.

29 Claims, 9 Drawing Sheets

| w | t | s | g | c | b | d | h |
|---|---|---|---|---|---|---|---|
|   | k | r | f | a | x |   |   |

FIGURE 4

LOSSLESS AND NEAR-LOSSLESS IMAGE COMPRESSION

PRIORITY DATA

This application claims priority to Provisional Application for U.S. Patent, Ser. No. 61/158,908, filed Mar. 10, 2009, entitled "Lossless and Near-Lossless Image Compression", by MacInnis, et. al., which is incorporated herein by reference for all purposes.

BACKGROUND OF THE INVENTION

Video compression and decompression can consume considerable amounts of DRAM bandwidth. DRAM is often accessed during video processing, compression and decompression. For example, during decompression, reconstructed frames are stored in DRAM. The DRAM is accessed for displaying the frames. Additionally, the DRAM is also accessed during motion compensation. During video compression, DRAM is accessed during motion estimation. During video processing, DRAM is accessed for storing and retrieving images. The foregoing consume considerable DRAM bandwidth that can potentially slow down operation that should be in real-time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to system(s), method(s), and apparatus for lossless and near lossless image compression, substantially as shown in and/or described in connection with at least one of the figures, as set forth more completely in the claims.

These and other advantages and novel features of the present invention, as well as illustrated embodiments thereof will be more fully understood from the following description and drawings.

BRIEF DESCRIPTION OF SEVERAL VIEWS OF THE DRAWINGS

FIG. 4 is a diagram of pixel components encoded in accordance with an embodiment of the present invention;

DETAILED DESCRIPTION OF PREFERRED EMBODIMENTS

Figure 1A:
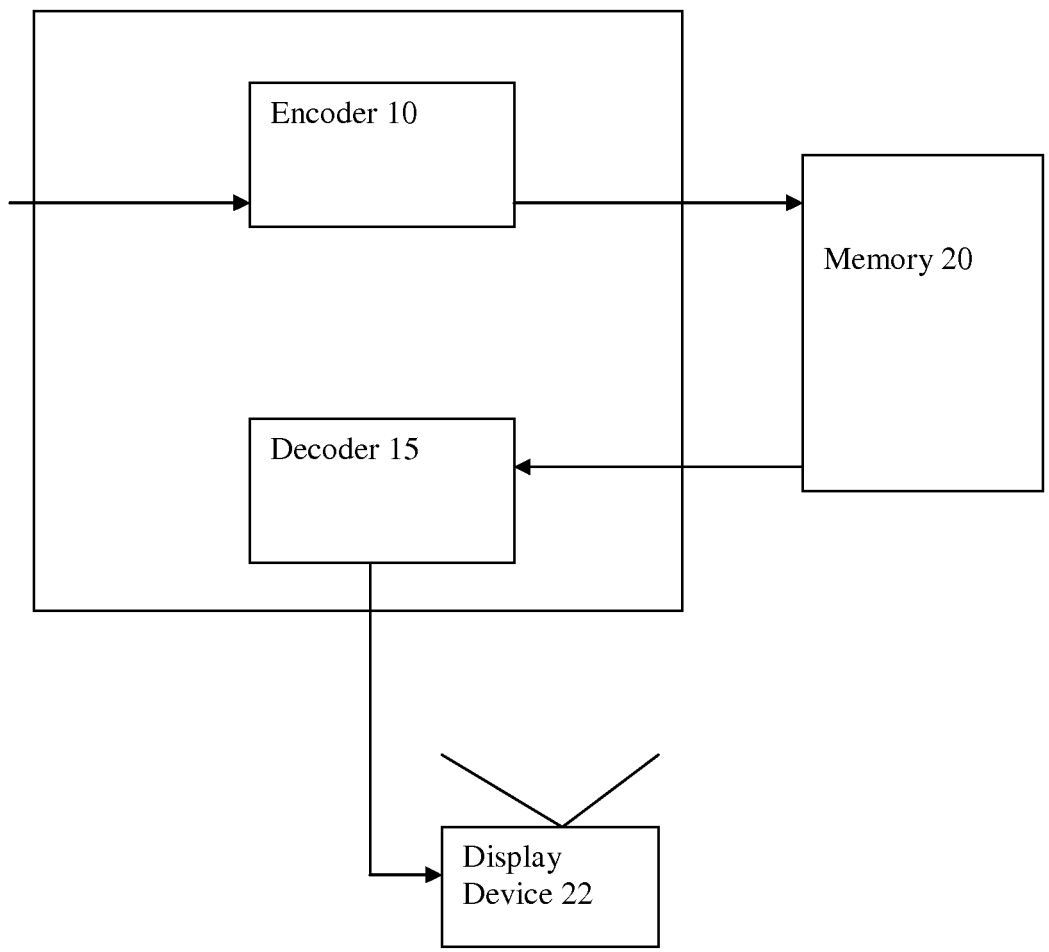
FIG. 1A is a block diagram describing an exemplary system in accordance with an embodiment of the present invention.

Referring now to FIG. 1A, there is illustrated a block diagram describing a system in accordance with an embodiment of the present invention. The system comprises an encoder 10, decoder 15, and memory 20. The encoder 10 receives data and uses a virtual buffer of predetermined capacity to model or simulate a buffer that would receive the encoded symbols and evacuate the symbols for transmission at a predetermined bit rate. The bit rate may be specified in units of bits per sample, or in units of bits per unit of time. This can be determined by maintaining a cumulative count of the number of bits that are used for encoding and subtracting the output bit rate. While the encoder may use buffers to buffer data prior to transmission to the memory 20, the predetermined capacity of the simulated buffer and the output bit rate do not necessarily have to be equal to the actual capacity of any buffer in the encoder or the actual output bit rate. The quantization step can be adjusted based on the fullness or emptiness of the virtual buffer. An exemplary encoder and operation of the encoder will be described below.

A decoder 15 can receive the encoded bitstream from the memory 20 with knowledge of the predetermined virtual buffer capacity and bit rate can determine the quantization step. As the decoder decodes the bitstream, the decoder can also determine the fullness or emptiness of the virtual buffer and adjust the quantization step. In this manner, the decoder can determine the quantization step. The decoder 15 decodes and provides the video data to a display device 22. Thus in some embodiments, the quantization step is not included in the bitstream, saving significant bandwidth and memory 20. An exemplary decoder and operation of the decoder 15 will be described below.

The memory 20 can comprise a variety of memories, such as DRAM, hard-disc, DVD, CD, a name a few by example, but not limitation. It is noted that although the encoder 10 and the decoder 15 are shown proximate in the foregoing embodiment, in other embodiments, the encoder 10 and the decoder 15 can be separate and transmit over a communication medium.

Figure 1B:
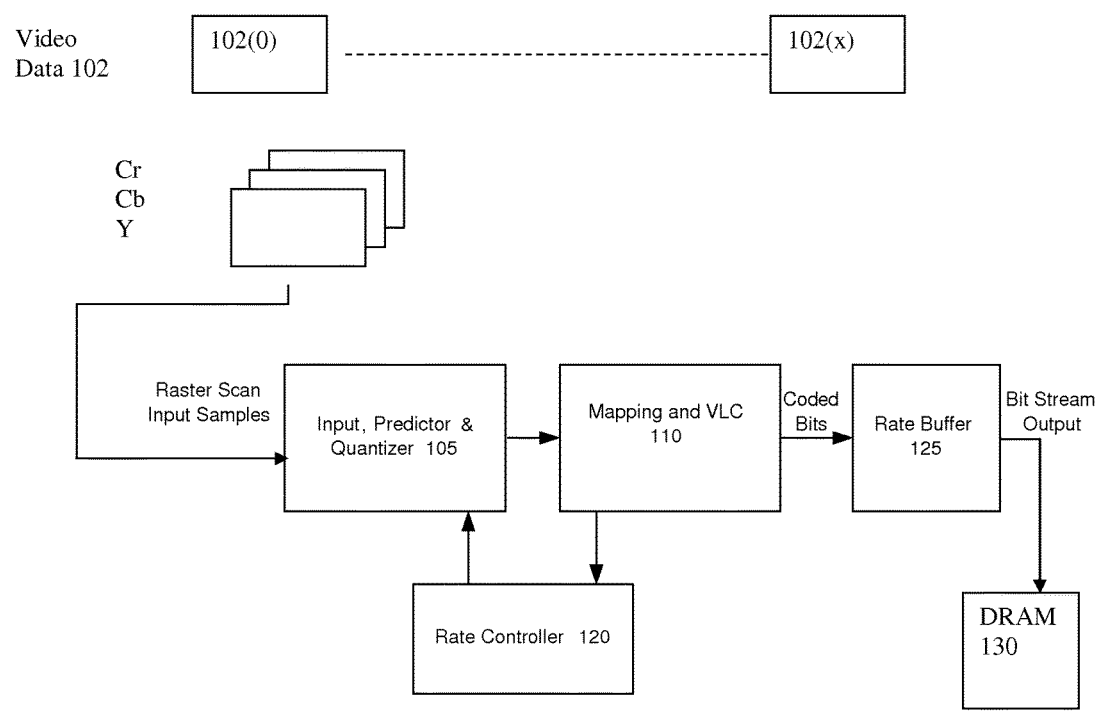
FIG. 1B is a block diagram describing an exemplary video encoder in accordance with an embodiment of the present invention.

Referring now to FIG. 1B, there is illustrated a block diagram of an exemplary video encoder 100 in accordance with an embodiment of the present invention. The video encoder 100 encodes video data 102. The video data comprises a series of successive frames 102(0) . . . 102(x).

The frames 102( ) comprise 2-dimensional matrices of pixel components, such as Red/Green/Blue (RGB), YUV, Luminance Y/Chroma Blue Cb/Chroma Red Cr (YCbCr), ARGB, to name a few. Each of the pixel components correspond to a spatial location. While the matrices may be overlaid to form a picture, each of the pixel components in the matrices are not necessarily co-located with pixel components in other matrices.

Each pixel component is encoded with a value comprising a predetermined number of bits, such as eight or ten bits per pixel component. The variety of formats that can be used, includes, but is not limited to, 10 bit YCbCr 422, 8 bit YCbCr 422, 10 bit YCbCr 444, 8 bit YCbCr 444, 8 bit ARGB 32, 8 bit RGB 24.

The video encoder 100 can receive the pixel components of the frames 102( ) in raster scan order (left to right, top to bottom). In certain embodiments of the present invention, the video encoder 100 can receive the pixels at a predetermined rate. The predetermined rate can correspond to the real-time frames per second display rate.

The video encoder 100 comprises an input, predictor & quantizer 105, a mapping and variable length coder 110, rate controller 120, a rate buffer 125, and DRAM 130. The video encoder 100 receives and encodes the pixels. While the number of bits representing pixels coming into the video encoder are typically constant (per pixel), the number of bits representing each coded pixel can vary dramatically. The number of bits representing coded pixels can also be increased by reducing the quantization step, or decreased by increasing the quantization step.

The input, predictor & quantizer 105 predicts and quantizes the pixel components, resulting in quantized residuals. In certain embodiments of the present invention, the input, predictor, & quantizer 105 can predict each pixel components from previously encoded and reconstructed pixel components in the same frame 102( ). The mapper and variable length coder 110 codes the quantized residuals, resulting in coded bits.

According to certain aspects of the present invention, the input, predictor & quantizer 105 uses a predetermined initial quantization step for quantizing a predetermined amount of data, such as video pixel data. The mapping and variable length coder 110 signals the rate controller 120 which instructs the input, predictor & quantizer 105 to increment, decrement, or leave unchanged the quantization parameter, as will be described in more detail below.

In certain embodiments, the mapping and variable length coder 110 codes the quantized sample values using their natural 2s complement binary values, and the number of bits used to code each value is determined dynamically by a combination of recent history of coded values of the same component and a prefix value associated with each unit of samples.

The rate controller 120 determines whether to increment, decrement, or leave unchanged the quantization step by simulating or modeling a buffer of predetermined capacity that is evacuated at a predetermined bit rate. This can be referred to as a virtual buffer. If the virtual buffer is becoming full, the rate controller 120 increases or increments the quantization step. If the virtual buffer is becoming empty, the rate controller 120 decreases or decrements the quantization step.

The fullness of the virtual buffer can be determined by counting the bits that are used to encode the input that is received over a given number of input samples and subtracting the product of the predetermined bit rate, in bits per sample, and the number of input samples. In certain embodiments of the present invention, the number of input samples can be as little as one sample.

A decoder can decode the bitstream starting with the initial quantization step. As the decoder decodes the bitstream the decoder can also determine the fullness of the virtual buffer. The decoder can determine the fullness or emptiness by observing the amount of bits that were used to encode an amount of decoded data corresponding to the number of input samples. The decoder then determines the quantization step decision that was made at the encoder. In certain embodiments of the present invention, the encoder can avoid transmitting the quantization step.

Figure 2:
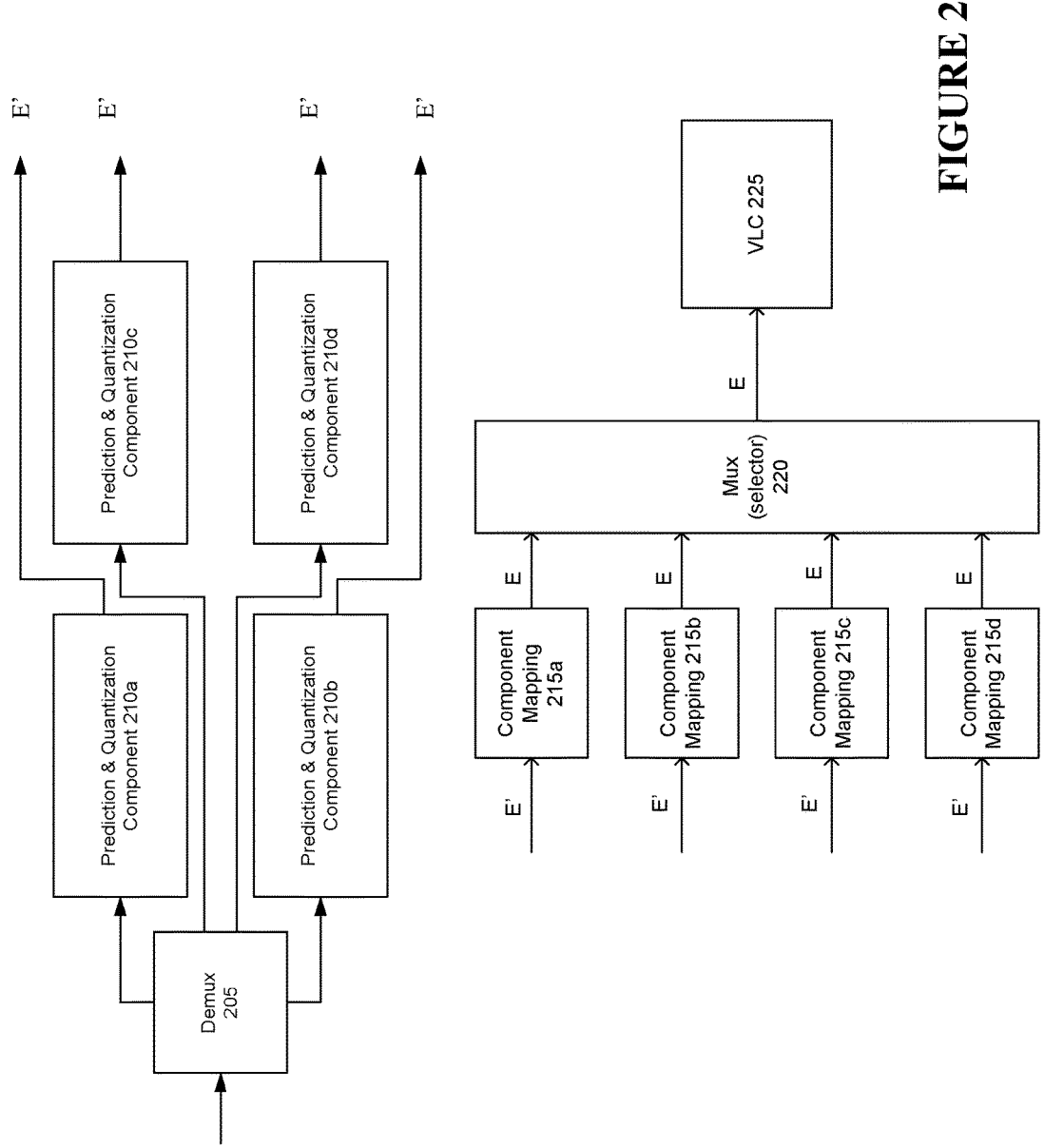
FIG. 2 is a block diagram of an exemplary parallel architecture for a video encoder in accordance with an embodiment of the present invention.

Referring now to FIG. 2, there is illustrated a parallel architecture in accordance with an embodiment of the present invention. Demultiplexer 205 receives the input pixel components, and separates each pixel component. The prediction & quantization blocks 210a, 210b, and 210c are associated with a particular one of the pixel components. In the case of a format with four pixel components, such as ARGB, prediction & quantization block 210d is also associated with a pixel component. Accordingly, separate prediction & quantization blocks 210 operates on each pixel component simultaneously with the other prediction & quantization blocks 210.

Each of the prediction & quantization blocks 210 provides quantized residuals to a particular one of component mappers 215a, 215b, 215c, and, in the case of ARGB, mapper 215d. Accordingly, a mapper 215 operates on each pixel component simultaneously.

The mappers 215 provide mapped quantized residuals to a multiplexer 220. The multiplexer 220 multiplexes the mapped quantized residuals into a single stream that is provided to the variable length coder 225. Alternatively, there may be a variable length encoder associated with each component mapper, and the multiplexer may multiplex the variable length encoded quantized residuals.

Figure 3:
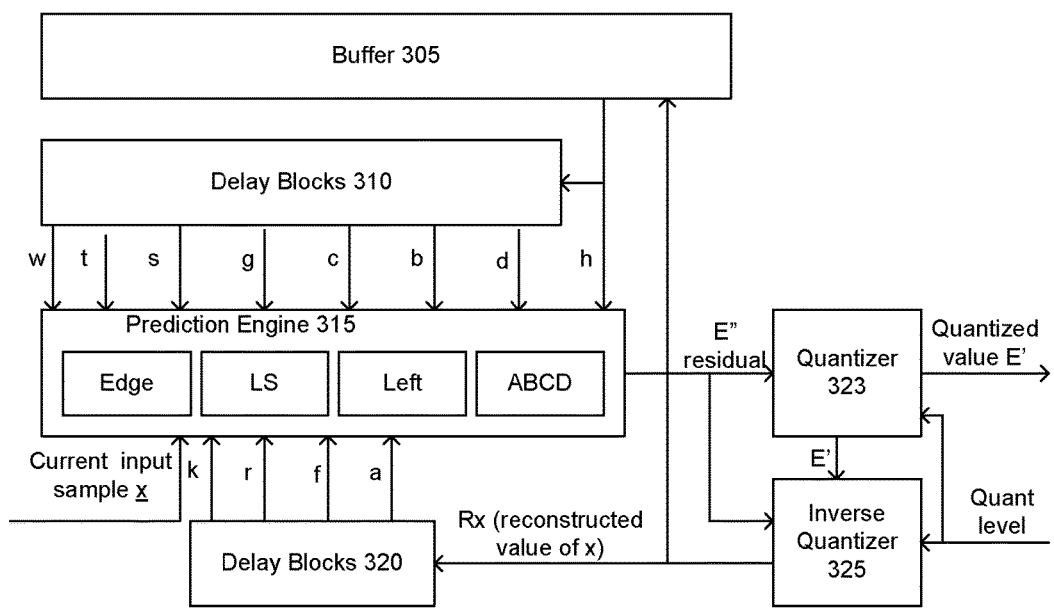
FIG. 3 is a block diagram of an exemplary predictor and quantizer in accordance with an embodiment of the present invention.

Referring now to FIG. 3, there is illustrated an exemplary predictor and quantizer in accordance with an embodiment of the present invention. The predictor 105 comprises a Buffer 305, delay blocks 310, a prediction engine 315, and delay blocks 320. The buffer 305 stores the previous reconstructed line. The prediction engine 315 receives the current pixel component x, reconstructed pixel components w, t, s, g, c, b, d, and h from the previous line from delay blocks 310, and reconstructed pixels from the left on the current line, k, r, f, a from delay blocks 320.

In order to use reconstructed pixel components, instead of the input pixel components, the quantizer 323 provides quantized residuals E' to an inverse quantizer 325. The inverse quantizer 325 inverse quantizes the quantized residuals. The reconstructed pixels are generated from the quantized residuals E'.

The prediction engine 315 comprises an Edge prediction engine EDGE, LS prediction engine LS, Left prediction engine LEFT, and ABCD prediction engine ABCD. As described above, the prediction engine 315 predicts the current pixel component x from reconstructed pixel components w, t, s, g, c, b, d, and h from the previous line, and reconstructed pixels from the left on the current line, k, r, f, a, thereby resulting in a residual E" representing the pixel component x.

Figure 4:
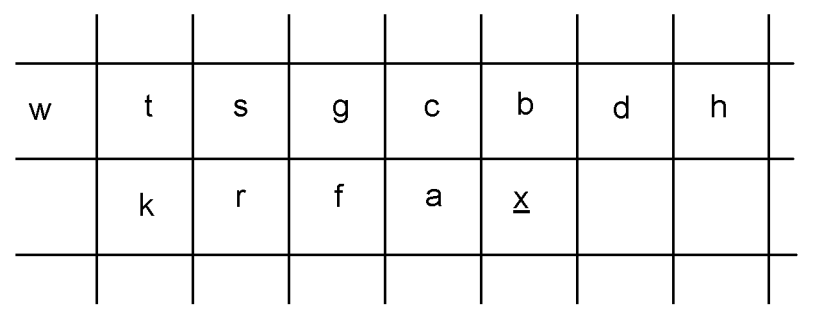

The operation of the prediction engine 315 will now be described with reference to FIG. 4, illustrating a block diagram of an exemplary diagram of pixel components that are predicted in accordance with an embodiment of the present invention.

Each pixel component is adaptively predicted from the neighboring reconstructed pixels of the line above and the left pixels of the same line of the pixel to be predicted. For example, pixel x can be predicted from a combination of any of the reconstructed pixels t, s, g, c, b, d, h, k, r, f, and a.

The spatial prediction adaptively chooses one of the four candidate prediction engines, EDGE, LS, Left, ABCD as its predictor for the current pixel component, according to the prediction errors determined for one or more previous reconstructed pixel components, considering all candidate predictors. This operation is the same in both the encoder and decoder, and no prediction control information is included in the compressed bit stream. The decoder has an identical prediction mode algorithm and it deduces the prediction mode used by the encoder. Once a predictor is selected, the value of each sample is predicted using the selected predictor. The residual value E" is calculated as the difference between the predicted value and the actual sample value.

LS Predictor

The LS predictor produces the predicted value Px of the current sample x by operating as shown in the following pseudo-code:

```
if (c >= max(a, b))
    Px = min(a, b);
else {
    if (c <= min(a, b))
        Px = max(a, b);
    else Px = a + b − c;}
```

ABCD Predictor

The ABCD predictor produces the prediction value Px=(a+b+c+d+2)/4, i.e. this is an average of four neighboring samples.

Left Predictor

The Left predictor uses the reconstructed value of the left pixel of the current sample as its prediction value, i.e. Px=a.

Edge Predictor

The Edge predictor employs more neighboring pixels than the LS predictor to detect a strong edge of several possible angles around the current sample x, and uses the strong edge information in the prediction. The directions of a strong edge to be detected are horizontal, vertical, 45 degree, 135 degree, about 22.5 degree and about 157.5 degree. The Edge predictor can be divided into two stages. The first stage is edge detection. The second stage is edge selection.

There are some options that are specified for the prediction function. The use of the reconstructed sample value "a", which is immediately to the left of x, is disabled by configuring the predictor with the parameter NOLEFT=1. Avoiding the use of sample "a" allows more time for the prediction, quantization and inverse quantization path to function, and this is important in high throughput uses where circuit timing may make it difficult to reconstruct sample "a" on time. The use of the reconstructed sample values "a" and "f", which are two samples immediately to the left of x, can be disabled by configuring the predictor with the parameter NOLEFT=2 (also referred to as NO2LEFT). This allows even more time for the prediction, quantization and inverse quantization path to function. When circuit timing requires three clock cycles for prediction, quantization and inverse quantization, the use of NOLEFT=2 enables a throughput of one sample per clock.

Individual predictors from the set of four listed above may be enabled and disabled. For certain classes of content, better performance may be obtained by utilizing a subset of the prediction functions. When predicting samples along the top and left edges of an image, restricted prediction functions such as only LEFT are utilized, as specified below.

NOLEFT=1 Option

When NOLEFT=1, the reconstructed sample value "a" in the LS, ABCD and Edge predictors (below) is replaced by its prediction Pa using the reconstructed samples f, g, and c according to the following pseudo-code:

```
if (ABS(g−c) > ABS(g−f)*3)
    Pa = c;
else {
    if (ABS(g−f) > ABS(g−c)*3)
        Pa = f;
    else Pa = (f+c+1)/2;}
```

NOLEFT=2 Option

When NOLEFT=2, the reconstructed sample values "f" and "a" in the LS, ABCD and Edge predictors (below) are replaced by their predictions Pf and Pa using the reconstructed samples r, s, g, and c. The prediction of "a" uses the same pseudo code as in NOLEFT, except that "f" is replaced by Pf according to the following pseudo-code:

Pf=(r+g+s+c+2)/4;

EDGE Prediction with NOLEFT=0, NOLEFT=1, NOLEFT=2

When NOLEFT=0, i.e. the left sample is used in the prediction, the following pseudo-code is applied to the edge detection:

```
if ( (2*ABS(a−c) > 6*ABS(c−b)) && 2*ABS(a−c) > 6*ABS(c−g)
&& 2*ABS(a−c) > 6*ABS(a−f) )
{
    edge1 = 0;
    strength1 = ABS(c−b);
}
else if ( 2*ABS(b−c) > 6*ABS(c−a) && 2*ABS(c−d) >
6*ABS(c−a) )
{
    edge1 = 1;
    strength1 = ABS(c−a) ;
}
else
{
    strength1 = max_strength;
    edge1 = 7;
}
if ( 2* ABS(a−g) > 6*ABS(a−b) && 2* ABS(a−g) > 6*ABS(f−c) )
{
    edge2 = 2;
    strength2 = ABS(a−b);
}
else if( 2* ABS(a−b) > 6*ABS(a−g) && 2* ABS(a−b) >
6*ABS(s−f))
{
    edge2 = 3;
    strength2 = ABS(a−g) ;
}
else
{
    strength2 = max_strength;
    edge2 = 7;
}
if ( 2*ABS(a−g) > 6*ABS(a−d) )
{
    edge3 = 4;
    strength3 = ABS(a−d) ;
}
else if ( 2*ABS(a−b) > 6*ABS(a−s) )
{
    edge3 = 5;
    strength3 = ABS(a−s) ;
}
else
{
    strength3 = max_strength;
    edge3 = 7;
}
```

When NOLEFT=1, i.e. the left sample is not used in the prediction, the following pseudo-code is applied to the edge detection:

```
if ( (2*ABS(f-g) > 6*ABS(c-g)) && 2*ABS(f-g) > 6*ABS(s-g)
&& 2*ABS(f-g) > 6*ABS(r-f) )
{
    edge1 = 0;
    strength1 = ABS(c-g);
}
else if ( 2*ABS(g-c) > 6*ABS(f-g) && 2*ABS(b-g) >
6*ABS(g-f) )
{
    edge1 = 1;
    strength1 = ABS(f-g);
}
else
{
    strength1 = max_strength;
    edge1 = 7;
}
if ( 2* ABS(f-s) > 6*ABS(f-c) && 2* ABS(f-s) > 6*ABS(r-g) )
{
    edge2 = 2;
    strength2 = ABS(f-c);
}
else if ( 2* ABS(f-c) > 6*ABS(s-f) && 2* ABS(f-c) >
6*ABS(r-t) )
{
    edge2 = 3;
    strength2 = ABS(s-f);
}
else
{
    strength2 = max_strength;
    edge2 = 7;
}
if ( 2*ABS(s-f) > 6*ABS(f-b) )
{
    edge3 = 4;
    strength3 = ABS(f-b) ;
}
else if ( 2*ABS(f-c) > 6*ABS(f-t) )
{
    edge3 = 5;
    strength3 = ABS(f-t);
}
else
{
    strength3 = max_strength;
    edge3 = 7;
}
```

When NOLEFT=2, i.e. the two left samples are not used in the prediction, the following pseudo-code is applied to the edge detection:

```
if ( (2*ABS(r-s) > 6*ABS(g-s) ) && 2*ABS(r-s) > 6*ABS(t-s)
&& 2*ABS(r-s) > 6*ABS(k-r) )
{
    edge1 = 0;
    strength1 = ABS(g-s);
}
else if ( 2*ABS(s-g) > 6*ABS(r-s) && 2*ABS(c-s) > 6*ABS(s-r) )
{
    edge1 = 1;
    strength1 = ABS(r-s);
}
else
{
    strength1 = max_strength;
    edge1 = 7;
}
if ( 2* ABS(r-t) > 6*ABS(r-g) && 2* ABS(r-t) > 6*ABS(k-s) )
{
    edge2 = 2;
    strength2 = ABS(r-g) ;
}
else if ( 2* ABS(r-g) > 6*ABS(t-r) && 2* ABS(r-g) >
6*ABS(k-w) )
{
    edge2 = 3;
    strength2 = ABS(t-r);
}
else
{
    strength2 = max_strength;
    edge2 = 7;
}
if ( 2*ABS(t-r) > 6*ABS(r-c) )
{
    edge3 = 4;
    strength3 = ABS(r-c);
}
else if ( 2*ABS(r-g) > 6*ABS(r-w) )
{
    edge3 = 5;
    strength3 = ABS(r-w);
}
else
{
    strength3 = max_strength;
    edge3 = 7;
}
```

The parameter "max_strength" is defined as the largest possible absolute difference between two samples, which is related to the pixel data format, i.e. for 8-bit data, max_strength=255, for 10-bit data, max_strength=1023. The same edge selection logic is applied in each case of NOLEFT=0, NOLEFT=1 and NOLEFT=2, except that the sample value "a" is replaced by its prediction Pa when NOLEFT=1 or NOLEFT=2, and the sample value "f" is replaced by its prediction Pf when NOLEFT=2.

```
if (strength1 <= strength2)
{
    if (strength1 <= strength3)
    {
        edge = edge1;
        strength = strength1;
    }
    else
    {
        edge = edge3;
        strength = strength3;
    }
}
else
{
    if (strength2 <= strength3)
    {
        edge = edge2;
        strength = strength2;
    }
    else
    {
        edge = edge3;
        strength = strength3;
    }
}
if (strength == max_strength || edge == 7)
    Px = (a+c+b+d+2) / 4;
else
{
    switch(edge)
    {
        case 0: Px = a;
        case 1: Px = b;
        case 2: Px = d;
        case 3: Px = c;
        case 4: Px = h;
        case 5: Px = g;
    }
}
```

Predictor Selection

A Unit is a logical grouping of adjacent samples of the same component. In an exemplary embodiment, the Unit size is selected to be equal to two. In alternative embodiments, the Unit size may be selected to have a value of one, three, four or another value. When the Unit size is selected to be equal to two, for every pair of samples of one component, all candidate predictors are evaluated using the previous pair of samples of the same component, and the predictor that performs best for that previous pair is selected for the current pair. There are certain exceptions under which the set of candidate predictors is restricted, for example when samples to the left or above are not available, or for example when one or more predictors are not enabled.

In an exemplary embodiment, for the first pair of samples of the image, i.e. the two samples on the left edge of the top line, the Left predictor is always selected as the predictor. For the first pair of samples of each line other than the first, the LS predictor is always selected. Sample values that are not available for use in prediction are assigned a predetermined value, for example one half of the maximum range of sample values.

For all other pairs of samples, the predictor is selected according to the estimated prediction errors of the left pair of samples, which are calculated for all four predictors. When the reconstructed value of the current sample x' is found, the estimated prediction error for the current sample can be calculated as follows.

$$\text{err\_sample} = \text{ABS}(x'-Px)$$

In the above equation, Px is the predicted value of the current sample from each of the four predictors. The prediction error of one predictor is the sum of err_sample over both samples in a pair of samples for a predictor. The predictor with the smallest prediction error is then selected as the predictor for the next pair of samples of the same component.

Note when NOLEFT=1, the prediction error of the left sample is not available. Assuming the current sample is "x" in FIG. 4, then if NOLEFT=0, the predictor selected by the left pair, i.e. samples of "f" and "a", is used for the current sample pair. If NOLEFT=1, the predictor selected by the smallest prediction error of the available left pair is used, i.e. samples of "r" and "f" if "x" is the second sample of the pair, or samples of "r" and "k" if "x" is the first sample of the pair. If NOLEFT=2, the predictor selected by the smallest prediction error of the samples of "r" and "k" is used if "x" is the first sample of the pair, or samples of "k" and its immediately left one if "x" is the second sample of the pair. The residual or error value E" is determined as: E"=x–Px.

The reconstructed sample value of x, for use in future predictions, is derived as in the following pseudo-code:

```
x' = Px + E' * QuantDivisor;
if (x' < 0) x' = 0;
else if (x' > MAXVAL) x' = MAXVAL;
```

The value QuantDivisor is defined below.

MAXVAL is the maximum value that can be coded by the uncompressed video sample word size, i.e. 1023 for 10 bit video, and 255 for 8 bit video. In an exemplary embodiment, Cb and Cr are non-negative integers.

Figure 5:
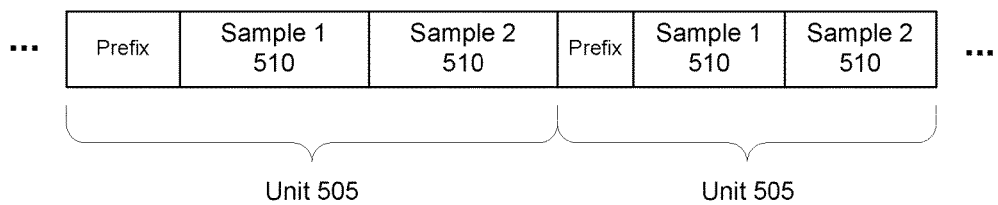
FIG. 5 is a diagram describing pixel components encoded with variable length coding in accordance with an embodiment of the present invention.

The operation of the Mapper and Variable Length Coder 110 will now be described with reference to FIG. 5, in accordance with an embodiment of the present invention. The Mapper and Variable Length Coder 110 uses entropy coding wherein coded sample values are coded using their natural 2s complement binary values, and the number of bits used to code each value is determined dynamically by a combination of the recent history of coded values of the same component and a prefix value associated with each Unit 505 of samples. In certain embodiments, a Unit 505 comprises 2 samples 510 of one component type, i.e. Y, Cb or Cr, or Alpha, R, G or B.

In certain embodiments of the present invention, the Cb and Cr samples can be coded together in one unit. The same set of components can be used for the prediction of the number of bits.

Each Unit 505 of samples has a Unit sample size. The Unit 505 sample size is always large enough to code each of the samples contained in the Unit 505, and it may be larger. The size of one sample is the number of bits required to code the sample's value in 2s complement. For example, a value of 0 has a size of 0, a value of −1 has a size of 1, a value of −2 or 1 has a size of 2, a value of −4, −3, 2 or 3 has a size of 3, and so on.

For each Unit 505, there is a maximum sample size, which is the maximum of the sizes of all the samples in the Unit 505. Also for each Unit 505 there is a predicted size. In an exemplary embodiment, if the predicted size is greater than or equal to the maximum sample size, then the Unit 505 sample size is equal to the predicted size. In an exemplary embodiment, if the maximum sample size is greater than the predicted size, then the difference, which is always non-negative, is coded in the prefix value, and the maximum sample size is used as the Unit 505 sample size. In another embodiment, if the maximum sample size is different from the predicted size, then the difference, which may be positive or negative, is coded in the prefix value. The prefix value uses unary coding, i.e. for embodiments with non-negative prefix values, the value 0 has the code 1 (binary), the value 1 has the code 01, the value 2 has the code 001, and so on. The Unit sample size is the sum of the predicted size and the prefix value 515. For 10 bit video, the greatest possible sample size is 10, and the smallest possible predicted size is 0, so the greatest possible prefix value is 10, which occupies 11 bits i.e. 0000 0000 001. For embodiments with signed prefix values, signed prefix values are unary coded.

The predicted size is a function of the sizes of previously coded samples. In an exemplary embodiment, the predicted size is the average, with rounding, of the sizes of the samples of the same component of the previous two samples, i.e. of the previous Unit, given that the Unit size is 2. If the Unit size is 4, the predicted size is the average of the sizes of the four samples of the same component of the previous Unit. If the Unit size is 3, the predicted size is generated by the average of the sizes of the last two samples of the same component of the previous Unit, thereby avoiding division of 3.

For example, if a component of an image, after quantization, is such that the size of the samples is 2 for many consecutive samples, then the predicted size is 2, and the prefix value is 0. Therefore the prefix code is '1', and each sample is coded using 2 bits, and a Unit of two samples has a total of 5 bits. In the event of a transient causing a sudden increase in the sample size, the prefix value codes the increase in the sizes. In the event of another transient causing a sudden decrease in the sample size, the prefix value is 0 and the Unit sample size is equal to the predicted size, which is in excess of the sizes of the samples in the Unit. Therefore each sample is coded with a number of bits equal to the predicted size, even though their own sizes are less. Following each such transient, in the absence of another change in sample sizes, the Unit sample size and predicted size converge again.

This scheme results in very efficient coding of samples, given that the sizes of the samples may change from Unit to Unit, particularly when the sizes do not frequently change very rapidly.

The delta size Unit variable length coding (DSU-VLC) scheme is easy to encode and decode at high speed in hardware since there are no VLC tables. The number of bits in a Unit to be decoded is determined from the prefix value (counting zeros) and the predicted size, which can be determined before encoding or decoding the current Unit. It is feasible to encode or decode one Unit per clock, and faster decoding approaches are also feasible. Encoding can encode multiple Units in parallel, for greater throughput. The Unit size may be selected to be greater than two for various reasons. For example, larger Unit size may be chosen where the usage imposes a throughput requirement that cannot practically be met with a Unit size of 2, in which case a Unit size of 3 or 4 may be used.

Referring again to FIG. 3, the quantizer 323 quantizes the residuals E", which in general includes the case of lossless coding, using a quantization parameter Quant. Quant takes on values ranging from 0, i.e. lossless, to the value that corresponds to the highest value of QuantDivisor[ ] (see below). With an exemplary set of values of QuantDivisor and QuantOffset shown below, the value of Quant ranges from 0 to 17.

Quantization is performed on the residual value E" as shown in the following pseudo-code.

```
if (Quant = 0)
    E' = E";
else
    if (E" >= 0)
        E' = (E" + QuantOffset[Quant]) / QuantDivisor[Quant];
    else E' = (E" − QuantOffset[Quant]) / QuantDivisor[Quant];
``` where division is with truncation, as in the C language.

The set of divisors is:
int QuantDivisor[ ]={1, 3, 5, 7, 9, 10, 12, 14, 16, 18, 20, 24, 28, 32, 48, 64, 128, 256};
The associated set of offsets, i.e. rounding constants, is:
int QuantOffset[ ]={0, 1, 2, 3, 4, 4, 5, 6, 7, 8, 9, 11, 13, 15, 23, 31, 63, 127};

In this scheme, there are 4 odd-valued divisors (3, 5, 7 and 9), plus seven that are products of one of these odd-valued divisors and one of five other values each of which is a power of 2, i.e. a 2**N value. As a result, in an exemplary embodiment, the quantization function supports 4 odd-valued divisors.

The use of this particular set of values of Quant Divisor[ ] provides good compression with low complexity. Note that division by these odd numbers can be performed in hardware using multiplication by one of a small set of optimized constant values.

The value of Quant is determined via a rate control scheme, which in an exemplary embodiment is performed identically in both the encoder and decoder. The rate control scheme bases its decisions on a measure of the activity of the most recently coded predetermined number of pixel components and on the fullness of the buffer model. The value of Quant is updated once per coded predetermined number of pixel components.

Figure 6:
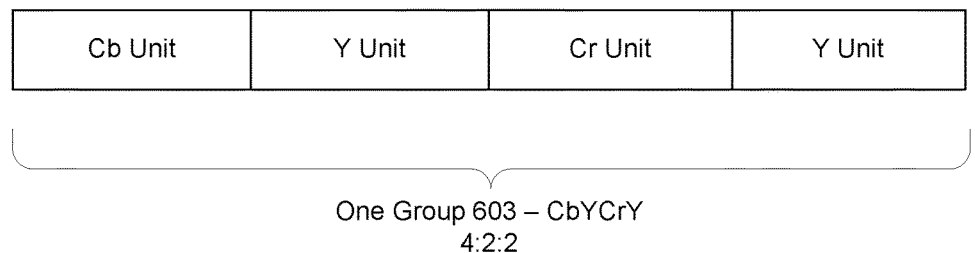
FIG. 6 is a block diagram describing an exemplary buffer model in accordance with an embodiment of the present invention.
Figure 6:
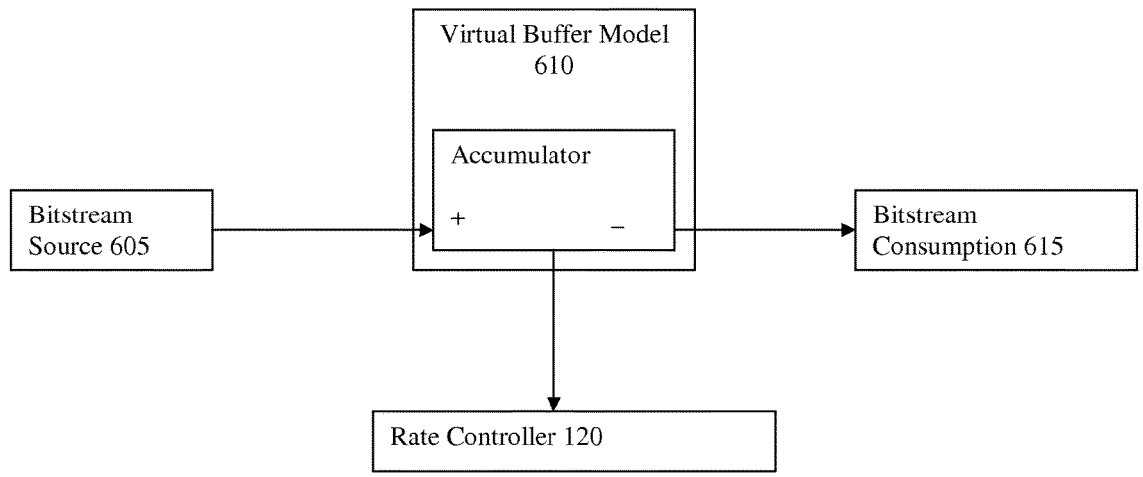

Referring now to FIG. 6, there is illustrated a block diagram of an exemplary buffer model in accordance with an embodiment of the present invention. The model comprises a bitstream source 605, virtual buffer model 610, rate controller 120, and a bitstream consumption module 615. The virtual buffer model 610 models the behavior of a rate buffer where the output bit rate is exactly the specified bit rate. The specified bit rate may be in units of bits per pixel or per group of pixels, or it may be in other units such as bits per unit of time, such as bits per second. The bitstream source 605 can comprise the output of the Mapper and Variable Length Coder 110. Bits enter the virtual buffer model 610 when they are created. For example, the number of bits used to code a Group is added to the model 610 when the Group is coded. Bits leave the virtual buffer model 610 according to a pre-determined schedule. For example, the schedule may consist of a constant rate in units of bits per group. The virtual buffer model 610 may be implemented as an accumulator, where one value is added and other value is subtracted for every Group. Alternatively, the schedule of removing bits from the virtual buffer model may be in units of bits per second. Alternatively, the times at which bits are added to or subtracted from the buffer model 610 may be finer or coarser than a Group, and may use a construct other than a Group, such as a sample, a macroblock, a slice or a picture. In order to model the behavior of a FIFO, the fullness of the virtual buffer model 610 may be clamped to 0 when subtracting a number of bits from the fullness would otherwise result in a negative value of fullness.

As long as the output bit rate used in the virtual buffer model is less than or equal to the actual bit rate at which bits are removed from the rate buffer in an encoder, and the rate control ensures that the virtual buffer model does not overflow, the rate buffer also does not overflow. More generally, the virtual buffer model can be used in the encoder to manage the rate of creation of bits by the encoder such that another virtual buffer model, which may be applied later to the encoder's bit stream, does not overflow or underflow. The bit rate at which bits leave the virtual buffer model can be changed at any time to any supported value. If the actual rate at which bits leave the rate buffer equals or approximates the rate at which bits leave the virtual buffer model, the encoder's bit rate can be set to any supported bit rate with effectively instantaneous response. Because the rate control uses the virtual buffer model to manage the rate of creation of bits, the rate control function does not need to monitor the rate at which bits leave the rate buffer.

In an exemplary embodiment, the encoder and decoder perform identical rate control (RC) decisions, which control the value of Quant, without the encoder transmitting any bits to indicate quantization control. The rate control depends on the activity, measured by the sizes of the samples, of the previous Group, as well as fullness of the virtual buffer model, and a measure of the strength of an edge, if any, in the preceding samples. It uses several configurable thresholds. Units 505 are organized into Groups 603. Groups 603 are utilized to organize the samples to facilitate the buffer model and rate control. In another exemplary embodiment, the decoder does not perform the same rate control decisions as the encoder, and the encoder transmits bits which indicate the quantization control.

In an exemplary embodiment, it is the responsibility of the encoder, including the rate controller 120, to ensure that the virtual buffer model never exceeds a defined maximum fullness, while choosing quantization levels to maximize overall subjective image quality. For some images and bit rates, both may be achieved relatively easily, while for others, the buffer fullness may vary and approach or reach (but never exceed) the size of the virtual buffer model and the quantization may vary and may reach the maximum allowed value at times.

The virtual buffer model 610 can represent a FIFO, of predetermined size, BufferSize. The value of BufferSize may be chosen according to the needs of the application. A larger size generally enables better compression for a given bit rate and image contents, and vice versa. A larger size also implies a larger amount of space available in a physical rate buffer, as well as potentially increased latency. In an exemplary embodiment, at the start of a picture, the buffer model is initialized to be empty. Alternatively, the virtual buffer model 610 fullness may be retained from one picture to the next, or it may be initialized to some other value.

As each Group 603 of samples is encoded, the number of bits used to code the Group is added to the accumulator in the virtual buffer model 610. After each Group is coded, a number equal to the budget of bits per Group, i.e. the specified bit rate, is subtracted from the accumulator, with the result clamped to 0 (i.e. non-negative fullness). In embodiments where the decoder mimics the rate control of the encoder, the same operation happens in the decoder: as each Group is decoded, the number of bits that the Group occupies is added to the model and the specified bit rate, i.e. the number of bits per Group, is subtracted, with the result clamped to 0. This way the encoder and decoder buffer models track exactly for every Group in each picture. The rate controller 120 can guarantee that the buffer fullness never exceeds the defined maximum value, i.e. the buffer size, by adjusting the value of Quant.

In an exemplary embodiment, at the start of each picture, the quantization value Quant is initialized to 0, corresponding to lossless coding. In another exemplary embodiment, the value of Quant is initialized to a non-zero value. The value of Quant is adjusted dynamically as required to avoid overflowing the buffer model while maximizing the compressed image quality. The rate control algorithm is designed to be able to encode difficult images at low bit rates with minimum visible quantization errors, as well as being able to encode difficult images at higher bit rates with no visible quantization error.

In an exemplary embodiment, the activity level of each Group is measured. The activity level is defined as the maximum sample size of each Unit in the Group, times the number of samples in a Unit (i.e. either 2 or 4), plus 1 (corresponding to a prefix value of 0), summed over all of the Units in the Group. The sample sizes are after quantization using the current value of Quant. As an example of 2 samples per unit and 3 units per group, the number of bits for sample 0 and 1 is SampleSize[0] and SampleSize[1] respectively. Assume the maximum of the two for unit 0 is MaxSizeUnit[0]=MAX(SampleSize[0], SampleSize[1]), then the activity level for the group is RcSizeGroup=MaxSizeUnit[0]+MaxSizeUnit[1]+MaxSize-Unit[2]. Another parameter that calculates the real number of bits coded in the last Group, i.e. BitsCodedCur in the pseudo-code (shown below), is also used in determining whether the value of Quant should be increased or decreased.

The following pseudo-code describes control of the quantization parameter, Quant, where the virtual buffer size is 16 Kbits. In this pseudo-code, "MaxBitsPerGroup" represents the pre-determined data rate in bits per group. Offset[ ] is a set of values that adjust the "target_activity_level" according to the fullness of the buffer model, which is represented by "Buffer_fullness", and which is compared to various threshold values represented by BufTh1, BufTh2, etc.

```
// Set target number of bits per Group according to buffer
fullness
if(Buffer_fullness < BufTh1)
{
    Target_activity_level = MaxBitsPerGroup + offset[0];
    MIN_QP = minQP[0];
    MAX_QP = maxQP[0];
}
else if(Buffer_fullness < BufTh2)
{
    Target_activity_level = MaxBitsPerGroup + offset[1];
    MIN_QP = minQP[1];
    MAX_QP = maxQP[1];
}
else if(Buffer_fullness < BufTh3)
{
    Target_activity_level = max(0, (MaxBitsPerGroup − offset[2]));
    MIN_QP = minQP[2];
    MAX_QP = maxQP[2];
}
else if(Buffer_fullness < BufTh4)
{
    Target_activity_level = max(0, (MaxBitsPerGroup − offset[3] ));
    MIN_QP = minQP[3];
    MAX_QP = maxQP[3];
}
else if(Buffer_fullness < BufTh5)
{
    Target_activity_level = max(0, (MaxBitsPerGroup − offset[4] ));
    MIN_QP = minQP[4];
    MAX_QP = maxQP[4];
}
else if(Buffer_fullness < BufTh6)
{
    Target_activity_level = max(0, (MaxBitsPerGroup − offset[5]));
    MIN_QP = minQP[5];
    MAX_QP = maxQP[5];
}
else if(Buffer_fullness < BufTh7)
{
    Target_activity_level = max(0, (MaxBitsPerGroup − offset[6]));
    MIN_QP = minQP[6];
    MAX_QP = maxQP[6];
}
else if(Buffer_fullness < BufTh8)
{
    Target_activity_level = max(0, (MaxBitsPerGroup − offset[7]));
    MIN_QP = minQP[7];
    MAX_QP = maxQP[7];
}
else if(Buffer_fullness < BufTh9)
{
    Target_activity_level = max(0, (MaxBitsPerGroup − offset[8]));
    MIN_QP = minQP[8];
    MAX_QP = maxQP[8];
}
else if(Buffer_fullness < BufTh10)
{
    Target_activity_level = max(0, (MaxBitsPerGroup − offset[9]));
    MIN_QP = minQP[9];
    MAX_QP = maxQP[9];
}
else if(Buffer_fullness < BufTh11)
{
    Target_activity_level = max(0, (MaxBitsPerGroup − offset[10]));
    MIN_QP = minQP[10];
    MAX_QP = maxQP[10];
}
else if(Buffer_fullness < BufTh12)
{
    Target_activity_level = max(0, (MaxBitsPerGroup − offset[11]));
```

```
    MIN_QP = minQP[11];
    MAX_QP = maxQP[12];
}
else if(Buffer_fullness < BufTh13)
{
    Target_activity_level = max(0, (MaxBitsPerGroup –
offset[12]));
    MIN_QP = minQP[12];
    MAX_QP = maxQP[12];
}
else if(Buffer_fullness < BufTh14)
{
    Target_activity_level = max(0, (MaxBitsPerGroup –
offset[13]));
    MIN_QP = minQP[13];
    MAX_QP = maxQP[13];
}
else
{
    Target_activity_level = max(0, (MaxBitsPerGroup –
offset[14]));
    MIN_QP = minQP[14];
    MAX_QP = maxQP[14];
}
```

The 14 values of threshold (BufTh 1 through 14) of buffer fullness in units of bits are designed for a virtual buffer model size of 16 Kbits (i.e. 16384 bits) as {1792, 3584, 5376, 7168, 8960, 10752, 12544, 13440, 14336, 15232, 15456, 15680, 15960, 16240}. The 15 values of offsets (offset[0 to 14]) for Target_activity_level are set as {20, 10, 0, −2, −4, −4, −8, −10, −10, −10, −10, −12, −12, −12, −12}.

At any range of buffer fullness, which is bounded by two consecutive thresholds, e.g. BufTh1<=Buffer_fullness<BufTh2, there is a range of Quant, specified by MIN_QP and MAX_QP, allowed for the RC to use. This helps to regulate the variation of Quant to avoid over-quantization when the buffer level is low, as well as avoiding the use of too many less significant bits that may not help with visual quality when the buffer fullness is high. The pair of parameters, MIN_QP and MAX_QP, associated with each range of buffer fullness levels are selected respectively from an array of 15 values of minQP[0 to 14], with default values of {0, 0, 1, 2, 2, 3, 4, 8, 8, 8, 13, 14, 15, 16, 17}, and an array of 15 values of maxQP[0 to 14] with default values of {2, 2, 2, 3, 3, 7, 9, 10, 11, 12, 13, 14, 15, 16, 17}, according to the buffer fullness level.

The value of Quant is adjusted according to the measured activity levels, the target activity level, the allowed Quant range specified by MIN_QP and MAX_QP, and the strength of a strong edge. When there is a strong edge, the activity level normally increases significantly if the value of Quant stays fixed. The RC algorithm detects the presence of a strong edge by examining the activity level of the current Group and that of the preceding Group as well as the associated values of Quant. When a strong edge is detected, the RC algorithm does not increase the value of Quant immediately after the presence of the strong edge, in order to avoid potential quantization noise that is more readily visible in smooth areas that may follow a strong edge. This factor may be observed for example in some cartoon contents. One parameter that serves as a threshold in detecting strong edges is defined as EdgeFactor in the pseudo code below.

To avoid excessive fluctuation of Quant around a high quantization value, which could result in visible high frequency quantization noise in some images, the increase of Quant is generally regulated not to be allowed for two consecutive Groups of pixels when the value of Quant is already high, with certain exceptions. However, the decrease of Quant is allowed as soon as the measured activity level is low. This function is controlled by two parameters defined as QuantIncrLimit[0] and QuantIncrLimit[1] in the pseudo-code below; their default values may be set to 11. In the following pseudo-code, RcSizeGroup represents the activity level, BitsCodedCur represents the actual number of bits used to code the most recently coded Group, and RcTgtBitsGroup represents the Target_activity_level. RcTgtBitOffset[0] and RcTgtBitOffset[1] are offset values that adjust the range of the target activity level. EdgeFactor is a parameter that is used to detect a strong edge. The quantization step of the last Group is Quant, which is saved as QuantPrev before it is assigned the value for the current Group. The operation of the Quant adjustment is as shown in the following pseudo code:

```
if ( RcSizeGroup < (RcTgtBitsGroup – RcTgtBitOffset[0])
  && BitsCodedCur < (RcTgtBitsGroup – RcTgtBitOffset[0]))
{    QuantPrev = Quant;
     Quant = MAX(MIN_QP, (Quant–1));
}
else if (BitsCodedCur > RcTgtBitsGroup + RcTgtBitOffset[1])
{    if ((QuantPrev == Quant && RcSizeGroup * 2 <
RcSizeGroupPrev *
EdgeFactor) || (QuantPrev < Quant && RcSizeGroup <
RcSizeGroupPrev *
EdgeFactor && Quant < QuantIncrLimit[0])
|| (Quant < QuantIncrLimit[1] ) )
     {    QuantPrev = Quant;
          Quant = MIN(MAX_QP, (Quant+1));} }
else QuantPrev = Quant;
When the buffer fullness approaches the maximum allowed level, the
above Quant value determined by the activity level will be replaced by
max_QP, i.e.
     if (Buffer_fullness >= BufTh_overflow_avoid)
          *Quant = max_QP;
Where BufTh_overflow_avoid is a programmable parameter.
```

Figure 7:
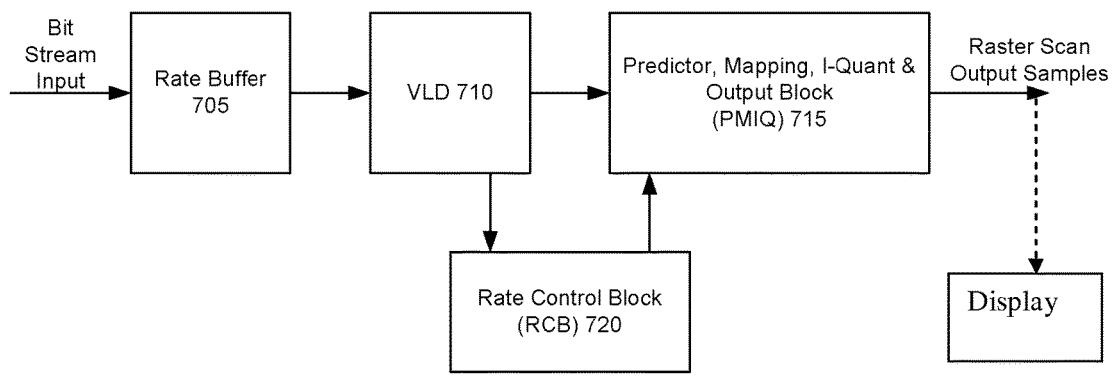
FIG. 7 is a block diagram of an exemplary video decoder in accordance with an embodiment of the present invention.

Referring now to FIG. 7, there is illustrated a block diagram describing an exemplary video decoder in accordance with an embodiment of the present invention. The video decoder comprises a rate buffer 705, a variable length decoder 710, predictor, mapper and inverse quantizer 715, and a rate controller 720.

The video decoder can be located proximate to the video encoder, and receive the bitstream input from DRAM 130 or another source. Alternatively, the video decoder can be located remotely from the video encoder and receive the input bitstream via a network.

The rate buffer 705 is a FIFO which temporarily stores compressed data bits after they are read from DRAM or received via the network. The rate buffer may be integrated with the rest of the video decoder or it may be located in another module, and it may be combined with another FIFO. The size of the rate buffer is chosen to be at least as large as the virtual buffer used in the video encoder. For example, where the video encoder uses a 16 kbits virtual buffer, i.e. 2048 bytes, the rate buffer is generally chosen to be the same size, i.e. 2048 bytes or larger. Ready-accept flow control is used between the rate buffer 705 and the VLD 710, to ensure that when the rate buffer is empty the decoding operation is suspended until there is data available in the rate buffer.

The fullness of the rate buffer 705, at any given time, is generally not the same as the fullness of the virtual buffer model, because the decoder virtual buffer model mimics the operation of the encoder virtual buffer model, not the operation of the decoder, and the buffer model operates with the specified number of coded bits/pixel times the number of pixels in a Group being removed from the buffer model every time a Group is decoded, i.e. the transmission of compressed bits is modeled as being exactly synchronized with the decompression function, while in actual operation the input of the rate buffer may be read from memory more quickly or more slowly than exactly this rate. This is one reason that the rate control, above, operates on the buffer model and not on the rate buffer fullness.

The input to the VLD 710 (variable length decoder) is a compressed bit stream. The compressed bit stream consists of a series of Groups, each of which consists of a set of Units. Each Unit has a Prefix and some number of samples; for example two, three or four samples. The VLD 710 operation is the inverse of the variable length coder (VLC) function. Since the input to the VLD is a single stream of bits, i.e. a stream of VLC coded samples, part or all of the VLD operation is performed sequentially and is not easily amenable to parallel operation. Some parts of the VLD 710 function can be pipelined, however.

In an exemplary embodiment, the VLD 710 function typically utilizes a Unit size of 2. The choice of Unit size is the same for both the encoder and decoder for any given image, since it is an attribute of the encoded bit stream.

The VLD 710 decoding operation entails determining the actual sizes (i.e. number of significant bits) of the samples in the previous Unit of the same component as the one currently being coded, and creating a predicted sample size from this information. This can be pipelined. The VLD 710 decodes the Prefix of each unit, which is unary coded. The decoded Prefix value is added to the predicted sample size value. The resulting sample size information indicates how many bits for each sample are contained in the Unit. The VLD 710 extracts from the incoming bit stream a number of bits equal to the determined sample size times the number of samples per Unit. Once these bits have been extracted, they are de-multiplexed and processed by subsequent decoding steps; these operations can be pipelined.

Similar to the VLC, the number of bits spent for the current Group as well as the activity level of the current Group are calculated and passed to the rate control block 720 for rate control. The VLD 710 generates the values of RcSizeGroup and BitsCodedCur and passes these to the RCB 720.

Once the coded samples are extracted, they are converted to a suitable format for subsequent processing, e.g. extend to an 11 bit 2s complement signed format, with sign-extension of negative sample values. These constant-width sample values are demultiplexed into individual component streams of samples, and sent to the Predictor, Mapping and I-Quant (PMIQ) block 715.

Figure 8:
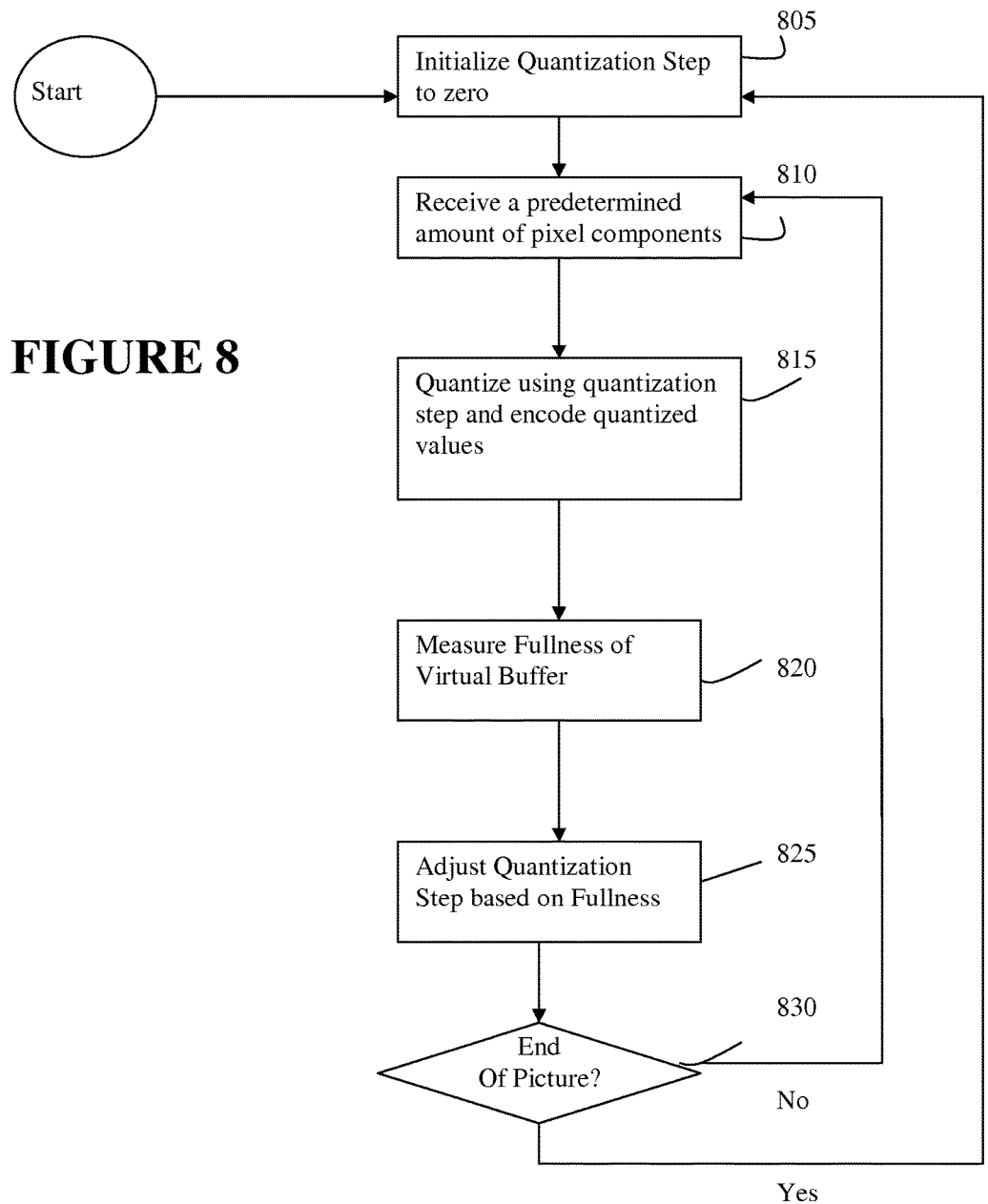
FIG. 8 is a flow diagram describing video encoding in accordance with an embodiment of the present invention.

Referring now to FIG. 8, there is illustrated a flow diagram describing video encoding in accordance with an embodiment of the present invention. At 805, the quantization step is initialized to zero. At 810, a unit of pixel components is received. At 815, the encoding includes quantization using the quantization step and encoding the quantized values. At 820, the fullness of the virtual buffer is measured. At 825, the quantization step is adjusted based on the fullness measured at 820. At 830, a determination is made whether decoding of the frame is finished. If encoding of the frame is finished, 805 is repeated. If encoding of the frame is not finished, 810 is repeated.

Figure 9:
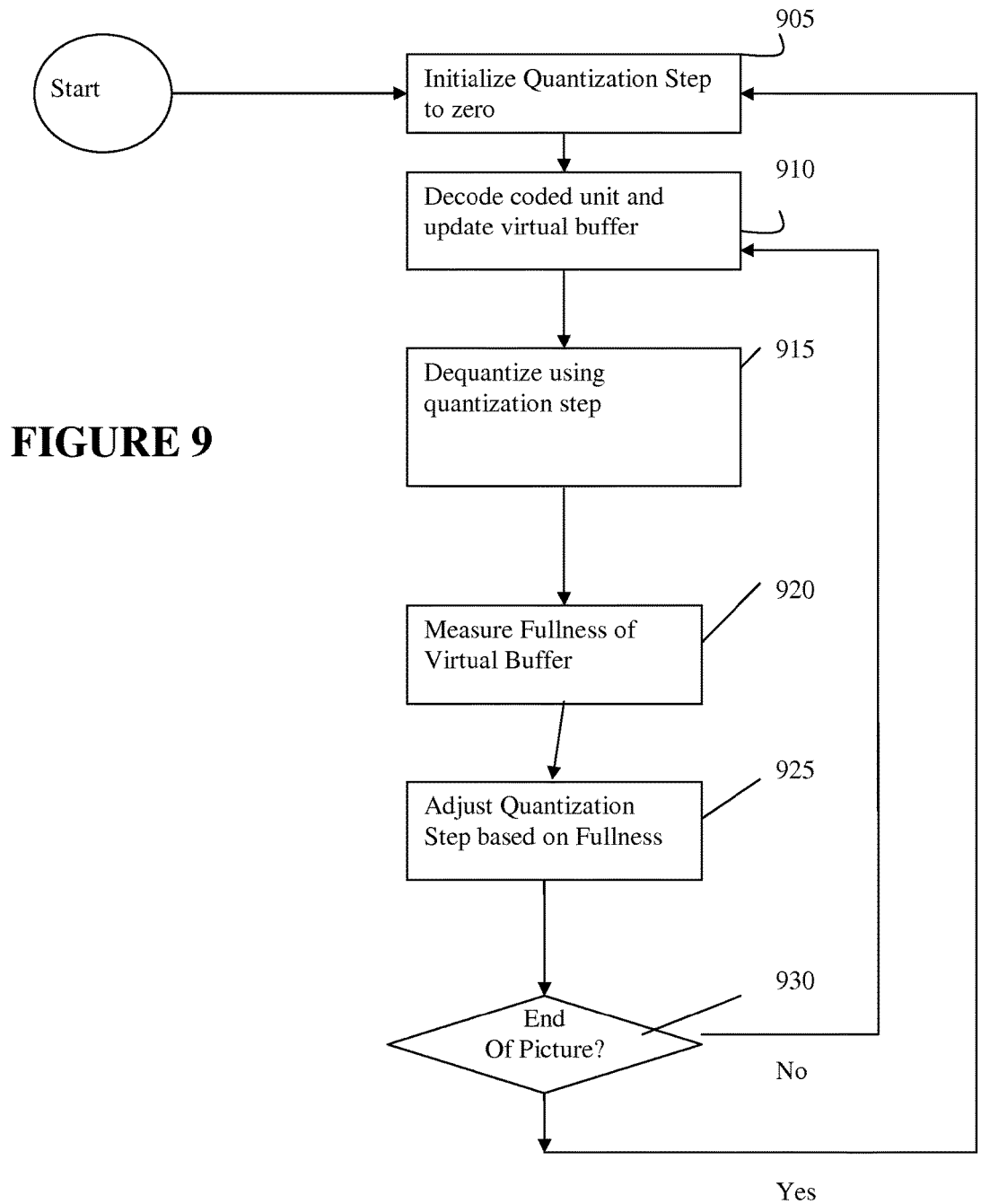
FIG. 9 is a flow diagram describing video decoder in accordance with an embodiment of the present invention.

Referring now to FIG. 9, there is illustrated a flow diagram describing video decoding in accordance with an embodiment of the present invention. At 905, the quantization step is initialized to zero. At 910, a coded unit is decoded and the virtual buffer is updated. At 915, the decoding includes dequantizing using the quantization step. At 920, the fullness of the virtual buffer is measured. At 925, the quantization step is adjusted based on the fullness measured at 920. At 930, a determination is made whether decoding of the frame is finished. If encoding of the frame is finished, 905 is repeated. If encoding of the frame is not finished, 910 is repeated.

The embodiments described herein may be implemented as a board level product, as a single chip, application specific integrated circuit (ASIC), or with varying levels of the system integrated with other portions of the system as separate components. Alternatively, certain aspects of the present invention are implemented as firmware or software. The degree of integration may primarily be determined by the speed and cost considerations.

While the present invention has been described with reference to certain embodiments, it will be understood by those skilled in the art that various changes may be made and equivalents may be substituted without departing from the scope of the present invention. Therefore, it is intended that the present invention not be limited to the particular embodiment disclosed, but that the present invention will include all embodiments falling within the scope of the appended claims and equivalents thereof.

The invention claimed is:

1. A method for encoding data implemented with a processor, a circuit, or any combination thereof and comprising the steps of:
    receiving, from an input bit stream, a group of data samples;
    encoding the group of data samples using a quantization parameter to produce an encoded data unit, the encoded data unit comprising a variable quantity of bits representing the group of data samples and a prefix value coded using a delta-size value indicating a difference between a size of the encoded data unit and a predicted size of the encoded data unit;
    determining the size of the encoded data unit based on the variable quantity of bits, wherein the size of the encoded data unit indicates a first number of bits;
    determining the predicted size of the encoded data unit, wherein the predicted size of the encoded data unit indicates a second number of bits and is a function of at least one of a plurality of previously encoded data units;
    determining the delta-size value using the difference between the size of the encoded data unit and the predicted size of the encoded data unit; and
    setting the prefix value of the encoded data unit using the delta-size value.

2. The method of claim 1, further comprising:
    determining an accumulated difference using the variable quantity of bits and a predetermined quantity of bits;
    determining a fullness of a virtual buffer model based on the accumulated difference; and
    adjusting the quantization parameter based on the determined fullness.

3. The method of claim 2, wherein the quantization parameter is set to an initial value and the group of data samples is first in a series of groups of data samples.

4. The method of claim 2, wherein adjusting the quantization parameter further comprises the steps of:
    comparing the fullness to a plurality of ranges of fullness of the virtual buffer model, wherein each of the plurality of ranges of fullness corresponds to a respective range of quantization parameter values;

determining one of the ranges of fullness that corresponds to the fullness; and
setting the quantization parameter to fall within the respective range of quantization parameter values of the corresponding range of fullness.

5. The method of claim 2, wherein adjusting the quantization parameter further comprises the steps of:
comparing the variable quantity of bits to a target quantity of bits;
decreasing the quantization parameter in response to determining that the variable quantity of bits is less than the target quantity of bits; and
increasing the quantization parameter in response to determining that the variable quantity of bits is greater than the target quantity of bits.

6. The method of claim 2, further comprising creating a buffer in a memory of a computing device, wherein the buffer comprises a queue.

7. The method of claim 1, wherein the group of data samples comprises a group of pixels.

8. The method of claim 1, wherein the prefix value has a variable length.

9. The method of claim 1, wherein the prefix value is encoded in a unary code.

10. A method for decoding data implemented with a processor, a circuit, or any combination thereof and comprising the steps of:
receiving from an input bit stream a data unit, the data unit comprising a variable quantity of encoded bits representing a group of data samples and a prefix value coded using a delta-size value;
determining a predicted size of the data unit as a function of at least one of a plurality of previously decoded data units, the predicted size of the data unit indicating a first number of bits;
determining the delta-size value of the data unit by decoding the prefix value, the delta-size value of the data unit indicating a second number of bits;
calculating a size of the data unit based on the predicted size of the data unit and the delta-size value of the data unit; and
decoding the variable quantity of encoded bits, based on the size of the data unit, using a quantization parameter to produce the group of data samples.

11. The method of claim 10, further comprising:
determining an accumulated difference using the variable quantity of encoded bits and a predetermined quantity of bits;
determining a fullness of a virtual buffer model based on the accumulated difference; and
adjusting the quantization parameter based on the determined fullness.

12. The method of claim 11, wherein the quantization parameter is set to an initial value and the variable quantity of encoded bits comprise a first group of bits in a series of bits.

13. The method of claim 11, wherein adjusting the quantization parameter further comprises the steps of:
comparing the fullness to a plurality of ranges of fullness of the virtual buffer model, wherein each of the plurality of ranges of fullness corresponds to a respective range of quantization parameter values;
determining one of the ranges of fullness that corresponds to the fullness; and
setting the quantization parameter to fall within the respective range of quantization parameter values of the corresponding range of fullness.

14. The method of claim 11, wherein adjusting the quantization parameter further comprises the steps of:
comparing the variable quantity of encoded bits to a target quantity of bits;
decreasing the quantization parameter in response to determining that the variable quantity of encoded bits is less than the target quantity of bits; and
increasing the quantization parameter in response to determining that the variable quantity of encoded bits is greater than the target quantity of bits.

15. The method of claim 11, further comprising creating a buffer in a memory of a computing device wherein the buffer comprises a queue.

16. The method of claim 10, wherein the group of data samples comprises a group of pixels.

17. The method of claim 10, wherein the prefix value has a variable length and is encoded in a unary code.

18. A system comprising:
one or more circuits, one or more processors, or any combination thereof for use in a digital video encoder, wherein the one or more circuits, one or more processors, or any combination thereof are configured to:
receive, from an input bit stream, a group of data samples;
encode the group of data samples using a quantization parameter to produce an encoded data unit comprising a variable quantity of bits representing the group of data samples and a prefix value coded using a delta-size value indicating a difference between a size of the encoded data unit and a predicted size of the encoded data unit;
determine the size of the encoded data unit based on the variable quantity of bits, wherein the size of the encoded data unit indicates a first number of bits;
determine the predicted size of the encoded data unit, wherein the predicted size of the encoded data unit indicates a second number of bits and is a function of at least one of a plurality of previously encoded data units;
determine the delta-size value using the difference between the size of the encoded data unit and the predicted size of the encoded data unit; and
set the prefix value of the encoded data unit using the delta-size value.

19. The system of claim 18, wherein the one or more circuits, one or more processors, or any combination thereof are configured to:
determine an accumulated difference using the variable quantity of bits and a predetermined quantity of bits;
determine a fullness of a virtual buffer model based on the accumulated difference; and
adjust the quantization parameter based on the determined fullness.

20. The system of claim 19, wherein the quantization parameter is set to an initial value and the group of data samples is first in a series of groups of data samples.

21. The system of claim 19, wherein the one or more circuits, one or more processors, or any combination thereof are configured to:
compare the fullness to a plurality of ranges of fullness of the virtual buffer model, wherein each of the plurality of ranges of fullness corresponds to a respective range of quantization parameter values;
determine one of the ranges of fullness that corresponds to the fullness; and
set the quantization parameter to fall within the respective range of quantization parameter values of the corresponding range of fullness.

22. The system of claim 19, wherein the one or more circuits, one or more processors, or any combination thereof are configured to:
- compare the variable quantity of bits to a target quantity of bits;
- decrease the quantization parameter in response to determining that the variable quantity of bits is less than the target quantity of bits; and
- increase the quantization parameter in response to determining that the variable quantity of bits is greater than the target quantity of bits.

23. The system of claim 18, wherein the group of data samples comprises a group of pixels.

24. A system comprising:
- one or more circuits, one or more processors, or any combination thereof for use in a digital video decoder, wherein the one or more circuits, one or more processors, or any combination thereof are configured to:
- receive from an input bit stream a data unit, the data unit comprising a variable quantity of encoded bits representing a group of data samples and a prefix value coded using a delta-size value;
- determine a predicted size of the data unit as a function of at least one of a plurality of previously decoded data units, the predicted size of the data unit indicating a first number of bits;
- determine the delta-size value of the data unit by decoding the prefix value, the delta-size value of the data unit indicating a second number of bits;
- calculate a size of the data unit based on the predicted size of the data unit and the delta-size value of the data unit; and
- decode the variable quantity of encoded bits using the size of the data unit and a quantization parameter to produce a group of data samples.

25. The system of claim 24, wherein the one or more circuits, one or more processors, or any combination thereof are configured to:
- determine an accumulated difference using the variable quantity of encoded bits and a predetermined quantity of bits;
- determine a fullness of a virtual buffer model based on the accumulated difference; and
- adjust the quantization parameter based on the determined fullness.

26. The system of claim 25, wherein the quantization parameter is set to an initial value and the variable quantity of encoded bits comprise a group of bits in a series of bits.

27. The system of claim 25, wherein the one or more circuits, one or more processors, or any combination thereof are configured to:
- compare the variable quantity of encoded bits to a target quantity of bits;
- decrease the quantization parameter in response to determining that the variable quantity of encoded bits is less than the target quantity of bits; and
- increase the quantization parameter in response to determining that the variable quantity of encoded bits is greater than the target quantity of bits.

28. The system of claim 25, wherein the one or more circuits, one or more processors, or any combination thereof are configured to:
- compare the fullness to a plurality of ranges of fullness of the virtual buffer model, wherein each of the plurality of ranges of fullness corresponds to a respective range of quantization parameter values;
- determine one of the ranges of fullness that corresponds to the fullness; and
- set the quantization parameter to fall within the respective range of quantization parameter values of the corresponding range of fullness.

29. The system of claim 24, wherein the group of data samples comprises a group of pixels.

* * * * *